June 29, 1948.  G. E. KAISER  2,444,295
DELAYED RESTARTING SYSTEM FOR POLYPHASE MOTORS
Filed Feb. 13, 1946

INVENTOR.
G. E. Kaiser
BY
Abrow Co.
ATTORNEYS.

Patented June 29, 1948

2,444,295

UNITED STATES PATENT OFFICE 2,444,295

DELAYED RESTARTING SYSTEM FOR POLYPHASE MOTORS

George E. Kaiser, Artesia, N. Mex.

Application February 13, 1946, Serial No. 647,261

7 Claims. (Cl. 318—484)

This invention relates to a delayed restarting system for polyphase motors.

An object of the invention is the provision of an arrangement for starting automatically, an electric motor of the three-phase type after a predetermined period has elapsed after stoppage in order to permit an irrigation pump driven by the motor to stop running in reverse caused by water falling down the pump shaft and rotating the turbine blades of said pump in reverse order.

Another object of the invention is the provision of an arrangement for starting automatically a three-phase electric motor which drives an irrigation pump, said arrangement including an electric clock of the automatic starter type which actuates gearing of a timing device for closing a switch in a circuit to start the three-phase motor, a solenoid being energized simultaneously with the starting of the clock for controlling a clutch, setting the gearing in operation, the clock and solenoid being energized prior to the starting of the motor but being deenergized when the three-phase motor is started, the timing device delaying the starting of the motor to permit the pump to stop running in reverse which is caused by water falling in the pump shaft and acting on the turbine blades.

A further object of the invention is the provision of a rugged, accurate and fool proof device contained in a small and compact housing for delaying energization of a three-phase motor which drives an irrigation pump so that water elevated in the pump shaft during normal operation will be permitted to flow back through the turbine blades and reverse the pump shaft after the motor has been stopped for some cause, the period of delay being varied in accordance with the time required to empty the pump shaft.

The invention consists in the novel construction, arrangements and combinations of parts hereinafter more particularly described and claimed.

Referring more particularly to the drawings 10 designates a switch box which may be made of plastic or other suitable material. The box includes a base 11, a top 12 and the usual end and side which support the top in spaced relation with the base.

Figure 1:
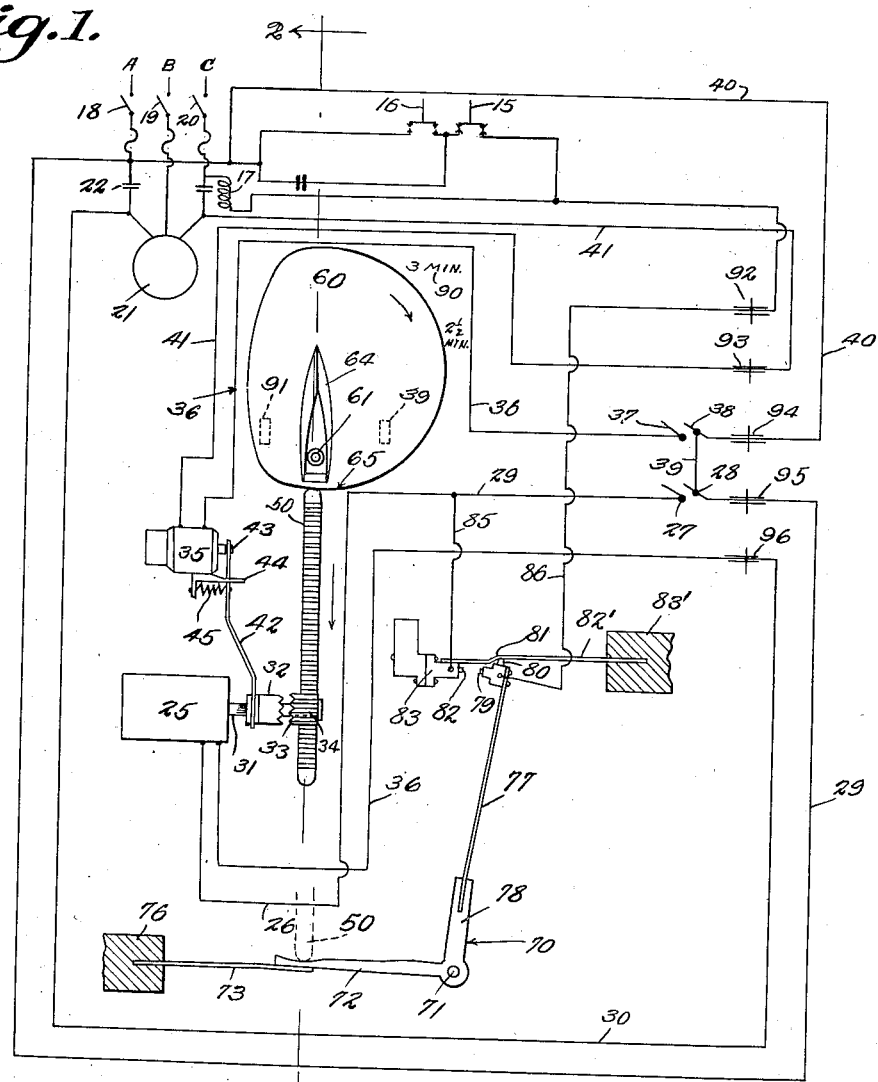
Figure 1 shows more or less diagrammatically an arrangement for automatically controlling a three-phase electric motor which operates a pump.
Figure 2:
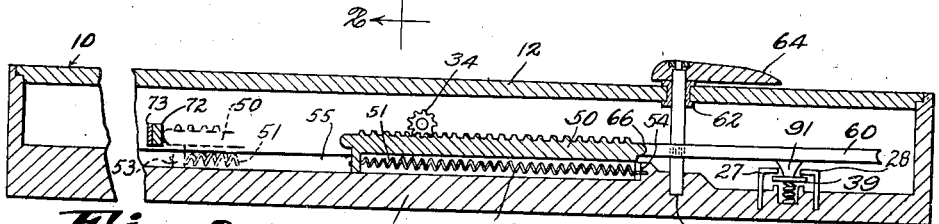
Figure 2 is a vertical section taken along the line 2—2 of Figure 1.

In the upper portion of the box in Figure 1 is shown a conventional form of a three phase starter panel containing a stop switch 15, a starting switch 16 and an actuating and holding coil 17. Such a coil, when energized, closes, and holds closed, drop-out switches (to be described), thus starting the motor, and when not energized, permits the drop-out switches to remain open. A three blade knife switch represented by the elements 18, 19 and 20 opens simultaneously the three phases of an electric motor generally designated by the numeral 21. A drop-out switch 22 is included in the line represented by phase A while a drop-out switch 23 is incorporated in phase C. Both drop-out switches are closed and held closed or are allowed to remain open by the actuating and holding coil, as mentioned above. The elements 15 through 23 constitute a conventional three-phase starter.

An electric clock motor 25 of the automatic starter type operates normally on 230 volts but if the voltage drops to less than 190 volts, the clock motor will stop. A wire 26 connects one side of the motor with one contact 27 of a switch 28 which is manually operated. A wire 29 connects the switch with the line side of the drop-out switch 22 of phase A of the motor 21. A wire 30 is connected to the lower side of the switch 22 as shown in Figure 1. Thus, when the line voltage is on and the switch 22 is open, there is full line voltage, phase A to phase B, across lines 29 and 30, the lower side being fed through the windings of the three-phase motor, which are of sufficiently low resistance and reactance not to affect appreciably the line voltage across the switch for a current as small as that required to operate the clock motor. When the drop-out switch 22 is closed, there is then zero voltage across it, and the clock motor does not operate.

A shaft 31 has a clutch element 32 splined thereon. A second clutch element 33 connected with a gear 34 loose on said shaft, is adapted to be engaged by the clutch element 32 for rotating the gear 34 for a purpose which will be presently explained.

A 230 volt midget solenoid 35 is connected by a wire 36 to a contact 37 of a switch 38. The switches 27 and 37 are connected together as shown at 39 so that both switches may be opened or closed manually and simultaneously. A wire 40 connects switch 38 with the drop-out switch 23 of phase C. A wire 41 connects the solenoid with phase C at the other side of the switch 23 so that said solenoid receives the line voltage from phase B to phase C. As in the case of the clock motor, the solenoid is energized when the drop-out switch 23 is open, so that there is full line voltage across it, and is deenergized whenever the drop-out switch is closed.

A yoke 42 engages a groove in the clutch element 32 and is connected with an armature 43 of the solenoid 35. A fulcrum 44 carried by the solenoid is engaged by the yoke 42 and maintained in engagement therewith by a coil spring 45 so that when the solenoid is deenergized the yoke will force the clutch element 32 away from the clutch element 33.

A rack 50 is always in mesh with the gear 34 and is moved downward as indicated by the arrow when said gear is revolved by the clock motor 25. A spring 51 is located in a groove 52 in the rack and has one end connected to the end 53 of said rack while the other end of said spring is connected to a shoulder 54 formed at one end of a slot 55 formed in the base 11. The slot forms a track for the reciprocating rack. The spring 51 returns the rack to its upper position shown in Figure 1 after the clutch elements 32 and 33 are released.

A cam shaped disk 60 is disposed within the box 10 and below the top plate 12 and is secured to a shaft 61 extending inwardly of the box 10. Said shaft has bearings at 62 and 63 and projects through the top plate. A pointer 64 is connected to the outer projecting end of the shaft. Thus, it will be seen that when the pointer is rocked the disk will be revolved.

The lower edge 65 is shown in engagement with a shoulder 66 at the upper end of the rack 50. When the pointer 64 is revolved the disk 60 will be revolved at its cam surface 67 and will ride against the shoulder 66 so that the rack will be depressed progressively.

A bell crank 70 is pivoted at 71 on the base 11 of the casing. The bell crank has an arm 72 in engagement with a spring 73 secured in a block 76 on the base 11. A spring member 77 extends from the arm 78 of the bell crank and has a switch contact 79 at its upper free end. A lug 80 on the contact engages a bent portion 81 and a spring member 82' secured in a block 83' carried by the base 11. When the lug 80 engages the bent portion of the spring 82' a contact 79 will be maintained downwardly from a switch contact 82 carried by a block 83.

A wire 85 connects the contact 82 with the wire 29. A wire 86 connects the contact 79 with the holding coil 17.

It will be noted from this construction that when the rack 50 is moved downwardly and depresses the arm 72 the contact 79 will be moved into engagement with the contact 82 thereby closing the circuit to the actuating and holding coil 17 for closing the drop-out switches 22 and 23.

The operation of my device is as follows:

The arrangement is designed primarily for use on irrigation pumps where operators are far away and have no way of knowing when the pump has been stopped for some particular reason. On such installations it is necessary to have a delay of from one half a minute to three minutes for the pump to stop running in reverse. The reverse running of the pump is caused by water falling down the pump shaft and passing through the turbine blades at the bottom of the shaft.

After the motor 21 has stopped for some reason and the current again enters the line, the clock mechanism 25 will be energized as soon as current entering the phase B will pass through the wires 29 and 30 to the clock mechanism and around the drop-out switch 22. In other words, the current flows back out through phase A. At the same time the solenoid 35 will be energized as soon as current flowing through phase B is shunted around the drop-out switch 23 through phase C.

As soon as the clock mechanism 25 is set in operation the shaft 31 will be rotated as will be the clutch member 32. As soon as the solenoid is energized the yoke 42 will move the clutch element 32 into engagement with the clutch element 33 thereby causing the gear 34 to revolve with a consequence that the rack 50 is moved downwardly until it engages the arm 72 of the bell crank 70 so that the circuit to the actuating and holding coil 17 will be closed by engagement of switch members 79 and 82 as has been previously explained.

When the actuating and holding coil 17 is energized the drop-out switches 22 and 23 will be closed so that the current will flow through the three phases, A, B, and C, operating the motor 21. As soon as the coil 17 has closed the switches 22 and 23 the clock mechanism 25 and the solenoid 35 will be deenergized.

Since it requires anywhere from one half a minute to three minutes to permit water to clear the pump shaft, the position of the rack 50 may be adjusted in order to vary the time between the energization of the clock mechanism 25 and when the lower end of the rack 50 operates the arm 72 sufficiently to close the switch elements 79 and 82. For this purpose a cam 60 is so positioned that when the pointer 64 is revolved in the direction indicated by the arrow the cam will depress the rack 50 against the tension of the spring 51. The face of the top plate 12 is provided with graduations 90 for indicating the time required for the clock mechanism 25 to move the rack 50 downwardly to operate the bell crank and close the circuit to the actuating and holding coil.

It must be borne in mind that the line current will not operate all the elements of the arrangement if any fuses are blown, or if for some other reason, any of the three phases are "dead." If phase A or B, or both of them, are out, the clock mechanism will not operate. Or, if phase B or C or both of them are out, the solenoid will not be energized. Furthermore it is necessary that the voltage be above 190 to operate the clock mechanism 25 so that if there is a decrease in voltage below a predetermined degree, the apparatus will not start until the proper voltage is maintained. This characteristic of the apparatus is desirable, since when such conditions exist, the three-phase motor 21 should not be started.

By connecting the switches 27 and 37 as explained they can be operated manually by revolving the pointer 64 to "off" position. This rotates the disk 60 on which lug 91 is attached so that said lug thus will depress the connection 39, thereby shifting switches 27 and 37 and deenergizing the starter.

The ratio of the number of teeth on gear 34 to the number of teeth on the rack 50 will determine the time range of the device.

Five terminals, 92, 93, 94, 95, and 96, will extend through the casing 10.

What is claimed is:

1. A control device for three-phase electric motors comprising a three-phase electric motor, drop-out switches in the first and third phases of the motor, an electric clock connected to be put in circuit with the first and second phases of the motor upon opening of one of the drop-out switches, a solenoid connected to be put in circuit with the second and third phases of said motor upon opening of the other drop-out switch, a shaft operated by the electric clock, a clutch element splined on the shaft, a gear loose on the shaft and having a clutch element, means operated by the solenoid for moving the first clutch element into the second clutch element, a slidable rack in engagement with the gear and moved in one direction when the gear is rotated by the clock, an actuating and holding coil controlling the drop-out switches, a circuit including the holding coil, a switch for closing the last-mentioned circuit and actuated by the rack when moved by the gear, and means manually positioning the rack relative to said last-mentioned switch for varying the time required for the gear to move the rack into operative relation with the switch, the closing of said switch deenergizing the clock and solenoid while causing closing of the drop-out switches and energization of the three-phase motor.

2. An automatic starting device for a three-phase electric motor comprising a drop-out switch each in the first and third phases of the motor, a circuit, an actuating and holding coil in said circuit controlling the closing of the switches for energizing said motor, a slidably mounted rack, a gear meshing with the rack and moving the rack in one direction, a clock mechanism for rotating the gear, a circuit including the clock and connected to the first phase at opposite sides of the associated drop-out switch, a solenoid, a circuit including the solenoid and connected with the third phase at opposite sides of the other drop-out switch, means operated by the solenoid for causing the gear to be rotated by the clock mechanism, and a switch in the holding coil circuit adapted to be moved to closed position when acted on by the moving rack.

3. An automatic starting device for a three-phase electric motor comprising a drop-out switch each in the first and third phases of the motor, a circuit, an actuating and holding coil in said circuit controlling the closing of the switches for energizing said motor, a slidably mounted rack, a gear meshing with the rack and moving the rack in one direction, a clock mechanism for rotating the gear, a circuit including the clock and connected to the first phase at opposite sides of the associated drop-out switch, a solenoid, a circuit including the solenoid and connected with the third phase at opposite sides of the other drop-out switch, means operated by the solenoid for causing the gear to be rotated by the clock mechanism, a switch in the holding coil circuit adapted to be moved to closed position when acted on by the moving rack, and manual means for moving the rack closer to the last-mentioned switch for causing an earlier closing of said switch.

4. In combination with a switch box for a three-phase electric motor including a drop-out switch in the first and third phases of the motor and an actuating and holding coil for closing said switches, a solenoid, wires connecting the solenoid with the third phase at opposite sides of one associated drop-out switch, a clock mechanism, wires connecting the clock mechanism with the first phase at opposite sides of the other associated drop-out switch, a circuit including the holding coil, a switch controlling said circuit, a slidable member for closing the last-named switch, means operated by the clock mechanism for actuating the slidable member to close said switch, and means actuated by the solenoid for causing the means operated by the clock mechanism to act on the slidable member.

5. In combination with a switch box for a three-phase electric motor including a drop-out switch in the first and third phases of the motor and an actuating and holding coil for closing said switches, a solenoid, wires connecting the solenoid with the third phase at opposite sides of one associated drop-out switch, a clock mechanism, wires connecting the clock mechanism with the first phase at opposite sides of the other associated drop-out switch, a circuit including the holding coil, a switch controlling said circuit, a slidable member for closing the last-named switch, means operated by the clock mechanism for actuating the slidable member to close said switch, means actuated by the solenoid for causing the means operated by the clock mechanism to act on the slidable member, and manual means for moving the slidable means closer to the last-named switch for causing an earlier closing of said switch, the closing of said switch causing deenergization of the clock mechanism and solenoid and energization of the three-phase motor.

6. In combination with a switch box for a three-phase electric motor including a drop-out switch in the first and third phases of the motor and an actuating and holding coil for closing said switches, a solenoid, wires connecting the solenoid with the third phase at opposite sides of one associated drop-out switch, a clock mechanism, wires connecting the clock mechanism with the first phase at opposite sides of the other associated drop-out switch, a circuit including the holding coil, a switch controlling said circuit, a slidable member for closing the last-named switch, means operated by the clock mechanism for actuating the slidable member to close said switch, means actuated by the solenoid for causing the means operated by the clock mechanism to act on the slidable member, means for positioning the slidable means closer to the last named switch for causing an earlier closing of said switch, the closing of the circuit to the holding coil causing closing of the drop-out switches for deenergization of the clock mechanism and solenoid and energization of the three-phase motor, and a spring returning the slidable means to an inoperative position when deenergization of the solenoid takes place.

7. An automatic starting device for a three-phase electric motor comprising drop-out switches in the first and third phases of the motor, an electric clock connected to be put in circuit with the first and second phases of the motor upon opening of the drop-out switches, a solenoid connected to be put in circuit with the second and third phases of said motor upon opening of the other drop-out switch, a manually operable switch tending to close both circuits simultaneously, a clutch element rotated by the clock when energized, a slidable rack, a gear meshing with the rack and adapted to move the rack in one direction, a circuit, an actuating and holding coil, controlling the drop-out switches, included in the last-mentioned circuit, a switch controlling closing of said circuit and actuated to closing position by the rack when operated by the gear for causing the holding coil to close the drop-out switches, a spring returning the rack to an inoperative position, and a manually operated cam acting on one end of the rack for moving the rack close to the switch in the holding circuit for limiting the time for closing said switch.

GEORGE E. KAISER.

REFERENCES CITED

The following references are of record in the file of this patent:

UNITED STATES PATENTS

| Number | Name | Date |
|---|---|---|
| 667,625 | Hopkinson et al. | Feb. 5, 1901 |
| 2,023,097 | Parsons | Dec. 3, 1935 |